United States Patent
Jasper et al.

(10) Patent No.: US 11,884,477 B2
(45) Date of Patent: Jan. 30, 2024

(54) VALVE AND DISPENSING APPARATUS

(71) Applicant: APTAR DORTMUND GMBH, Dortmund (DE)

(72) Inventors: Bernhard Jasper, Waltrop (DE); Guido Burmann, Rüthen (DE); Lukas Kurosky, Menden (DE)

(73) Assignee: APTAR DORTMUND GMBH, Dortmund (DE)

( * ) Notice: Subject to any disclaimer, the term of this patent is extended or adjusted under 35 U.S.C. 154(b) by 97 days.

(21) Appl. No.: 17/433,136

(22) PCT Filed: Feb. 27, 2020

(86) PCT No.: PCT/EP2020/055118
§ 371 (c)(1),
(2) Date: Aug. 23, 2021

(87) PCT Pub. No.: WO2020/174039
PCT Pub. Date: Sep. 3, 2020

(65) Prior Publication Data
US 2022/0185574 A1 Jun. 16, 2022

(30) Foreign Application Priority Data
Feb. 27, 2019 (DE) ............... 20 2019 000 947.7

(51) Int. Cl.
*B65D 83/48* (2006.01)
(52) U.S. Cl.
CPC .................... *B65D 83/48* (2013.01)
(58) Field of Classification Search
CPC ............... B65D 83/48; Y02W 30/80
(Continued)

(56) References Cited

U.S. PATENT DOCUMENTS

| 3,416,770 A | * | 12/1968 | Green | B65D 83/46 251/303 |
| 3,482,784 A | | 12/1969 | Webster | |

(Continued)

FOREIGN PATENT DOCUMENTS

| DE | 1954837 A1 | 9/1971 |
| DE | 2128981 A1 | 12/1971 |

(Continued)

OTHER PUBLICATIONS

International Preliminary Report on Patentabiiity for International Application No. PCT/EP2020/055118, dated Sep. 10, 2021.
(Continued)

*Primary Examiner* — Lien M Ngo
(74) *Attorney, Agent, or Firm* — Jason H. Vick; Sheridan Ross, PC

(57) ABSTRACT

A valve for dispensing a fluid from a container and a dispensing apparatus with such a valve are proposed. The valve has a spring device for returning a valve element to a closed position, the spring device being integral with the valve element. The spring device has a contact area for contact with a counterface of a valve body, the contact area forming an elevation of an outer surface of the spring device. The spring device and the counterface are in point contact with each other in any position of the valve element. The materials of the contact area and the counterface are matched to each other in such a way that they slide silently on each other. A seal of the valve is made of polyethylene or a thermoplastic elastomer. The valve is preferably designed as a full plastic valve and is easily recyclable.

16 Claims, 3 Drawing Sheets

Figure 1:
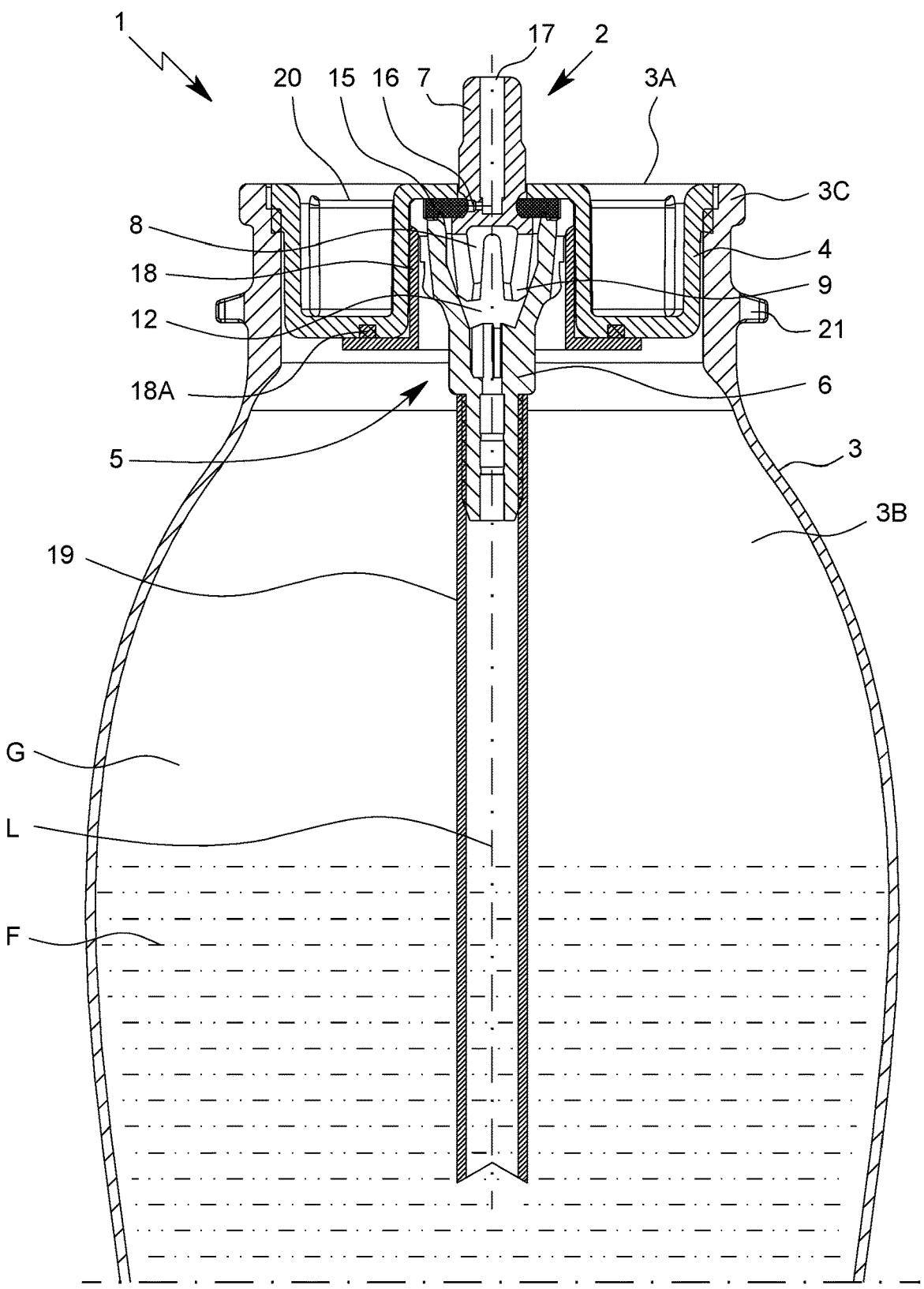

(58) Field of Classification Search
USPC .......................................... 222/402.1–402.25
See application file for complete search history.

(56) References Cited

U.S. PATENT DOCUMENTS

| | | | | |
|---|---|---|---|---|
| 3,618,833 | A | * | 11/1971 | Webster ................ B65D 83/46 222/511 |
| 3,647,121 | A | * | 3/1972 | Ayres ................... B65D 83/48 222/402.24 |
| 3,862,741 | A | * | 1/1975 | Steiman ................ B65D 83/48 251/353 |
| 4,471,893 | A | * | 9/1984 | Knickerbocker ...... B65D 83/48 222/402.24 |
| 5,290,539 | A | | 3/1994 | Marecki |
| 6,371,338 | B1 | * | 4/2002 | Klein ................... B65D 83/756 222/402.1 |
| 2006/0124903 | A1 | | 6/2006 | Ito et al. |
| 2009/0321381 | A1 | | 12/2009 | Paas et al. |
| 2017/0128113 | A1 | | 5/2017 | Vogt |

FOREIGN PATENT DOCUMENTS

| | | |
|---|---|---|
| DE | 3231630 T1 | 11/1983 |
| DE | 3807156 A1 * | 9/1989 |
| EP | 0325519 A1 | 7/1989 |
| EP | 3153240 A1 | 4/2017 |
| GB | 1238339 A | 7/1971 |
| JP | 2003-4037 A * | 2/2003 |
| WO | WO 82/02533 | 8/1982 |
| WO | WO 82/02533 A1 * | 8/1982 |
| WO | WO 89/08062 A1 * | 9/1989 |
| WO | WO 01/66439 A1 | 9/2001 |

OTHER PUBLICATIONS

International Search Report for International Application No. PCT/EP2020/055118, dated Jun. 17, 2020.
Written Opinion for International Application No. PCT/EP2020/055118, dated Jun. 17, 2020.
Hongfa, Zhu "Handbook of Raw Materials Commonly Used in Fine Chemicals" English Translation of "Chapter 11: Thermoplastic Polyurethane Elastomer" ISBN: 7-5082-2725-5; 2003.

* cited by examiner

VALVE AND DISPENSING APPARATUS

CROSS-REFERENCE TO RELATED APPLICATIONS

This application is a national stage application under 35 U.S.C. 371 of PCT Application No. PCT/EP2020/055118 having an international filing date of 27 Feb. 2020, which designated the United States, which PCT application claimed the benefit of German Application No. 20 2019 000 947.7, filed 27 Feb. 2019, each of which are incorporated herein by reference in their entirety.

The present invention concerns a valve according to the preamble of claim 1 as well as a dispensing apparatus.

In particular, the present invention concerns the field of aerosol containers, i.e. containers in which a fluid under pressure is contained which can be delivered or sprayed as an aerosol. Such containers can be used in particular for hygiene, care and cosmetic products such as deodorants or hairsprays. In principle, however, the present invention is versatile and can be used in any technical field in which a (metered) delivery of a fluid from a container takes place.

DE 38 07 156 A1 discloses an aerosol container with a valve plate with a discharge valve sealingly attached to its opening. The aerosol container, the valve plate and the housing of the dispensing valve are made of plastic. A valve cone of the valve is equipped with three spring struts which are supported in a sliding manner on a conical inner wall of the valve housing.

DE 32 31 630 T1 discloses a valve for an aerosol container with a plastic spring which is integral with a valve element of the valve. The plastic spring is formed by several elastic feet extending from the valve element. The feet are used for elastic contact on a beveled or curved surface of the valve body.

DE 21 28 981 OS discloses a valve for liquid containers. A valve element of the valve has coaxially arranged ribs that are in sliding elastic contact with a frustoconical inner surface of the valve.

It is an object of the present invention to provide a valve or dispensing apparatus, the valve or dispensing apparatus being characterized by low wear, convenient operation, reliable functioning and/or improved recycling.

The above object is solved by a valve according to claim 1 or a dispensing apparatus according to claim 15. Advantageous further developments are the subject of the sub-claims.

A proposed valve is designed for dispensing a fluid from a container, in particular an aerosol container. The valve comprises a valve housing, a valve element movably arranged in the valve housing and a spring device for returning the valve element to a closed position of the valve and/or valve element. Furthermore, the spring device is designed in one piece with the valve element.

According to a first aspect, the spring device has a contact area for contact with a counterface of the valve body, the contact area forming an elevation of an outer surface of the spring device. In this way, a defined and optimized contact surface between the spring device and the counterface can be realized. This is conducive to reliable functioning and comfortable operation.

According to another aspect, which can also be realized independently, the contact area and the counterface are in contact with each other in any position of the valve element via an at least essentially punctiform or linear contact surface. In particular, a minimized contact area can be achieved in this way, thus ensuring reliable operation of the valve and minimizing wear.

According to another aspect that can also be realized independently, the materials of the spring device and/or the contact area and the counterface are matched to each other in such a way that the contact area slides at least essentially noiselessly along the counterface when the valve element moves. In particular, appropriate material selection prevents squeaking when the valve element is actuated, thus enabling convenient operation and minimizing wear.

According to another aspect which can also be realized independently, a seal of the valve consists at least substantially and/or predominantly of polyethylene and/or a thermoplastic elastomer, in particular a urethane-based thermoplastic elastomer. In this case, preferably the valve element, the valve body and/or other parts of the valve are made of the same material as the seal. This enables an effective and/or efficient recycling of the valve.

The spring device is preferably formed by several legs or arms, which continue from the valve element, in particular in the longitudinal extension of the valve element. Preferably, the arms each form an elastic and/or resilient element, so that a spring effect is achieved which forces the valve element into a closed position.

The arms are preferably at least essentially triangular or V-shaped and/or are bounded by straight side edges and/or side edges converging at an acute angle.

Preferably, correspondingly, at least essentially triangular or V-shaped recesses are formed between the arms. This prevents the arms from colliding when the valve element moves and blocking further movement of the valve element.

The contact area is preferably located at a free end or adjacent to a free end of the valve element and/or spring device. Alternatively or additionally, the contact area is located at or adjacent to an outer edge of the spring device and/or valve element. This enables a continuous and/or defined contact of the contact area with the counter surface.

It is preferred that an angle formed or enclosed by an outer surface of one end or end portion of the spring device and a longitudinal axis of the valve element is greater than an angle formed or enclosed by the counterface and the longitudinal axis, preferably by at least 5° or 10°. This ensures that when the valve element moves, only the contact area comes into contact with the counterface and/or contact between other areas of the valve element and the counterface is avoided. This is conducive to a reliable function of the valve.

According to another aspect, a radius of the contact area is more than 0.25 mm, preferably more than 0.35 mm, and/or less than 0.65 mm, preferably less than 0.55 mm, particularly preferably about 0.45 mm. It has been shown that this results in a movement of the valve element and/or contact area along the counterface with particularly low noise and low friction. In addition, a defined contact surface is formed.

The valve element and/or spring device may also be formed by several contact areas, which are in particular separated from each other. Preferably, each arm has a contact area, in particular wherein the contact areas of the arms are similar or identical.

The spring device or the contact area and/or the counterface comprises preferably at least predominantly polyketone or consists of it. It has been shown that in this way the desired properties, such as sufficient elasticity and/or spring force, can be achieved with a simultaneous low-friction and low-noise movement of the contact area over the counter surface.

It is preferred that the spring device and/or its arms have a Young's modulus of more than 2000 MPa, preferably more than 2500 MPa, and/or less than 4000 MPa, preferably less than 3500 MPa. On the one hand, this ensures a low resistance when the valve element is actuated and on the other hand, sufficient spring force to return the valve element.

According to another aspect, two or more parts of the group consisting of the valve element, the valve housing and the seal may be made of the same material, in particular polyethylene or a thermoplastic elastomer. This makes the valve easy to recycle.

According to another aspect which can also be realized independently, the present invention concerns a dispensing apparatus for dispensing a fluid with a container, in particular an aerosol container, and a valve.

The aforementioned and subsequent aspects and features of the present invention may be combined with each other in any combination, but may also be realized independently of each other.

Figure 2:
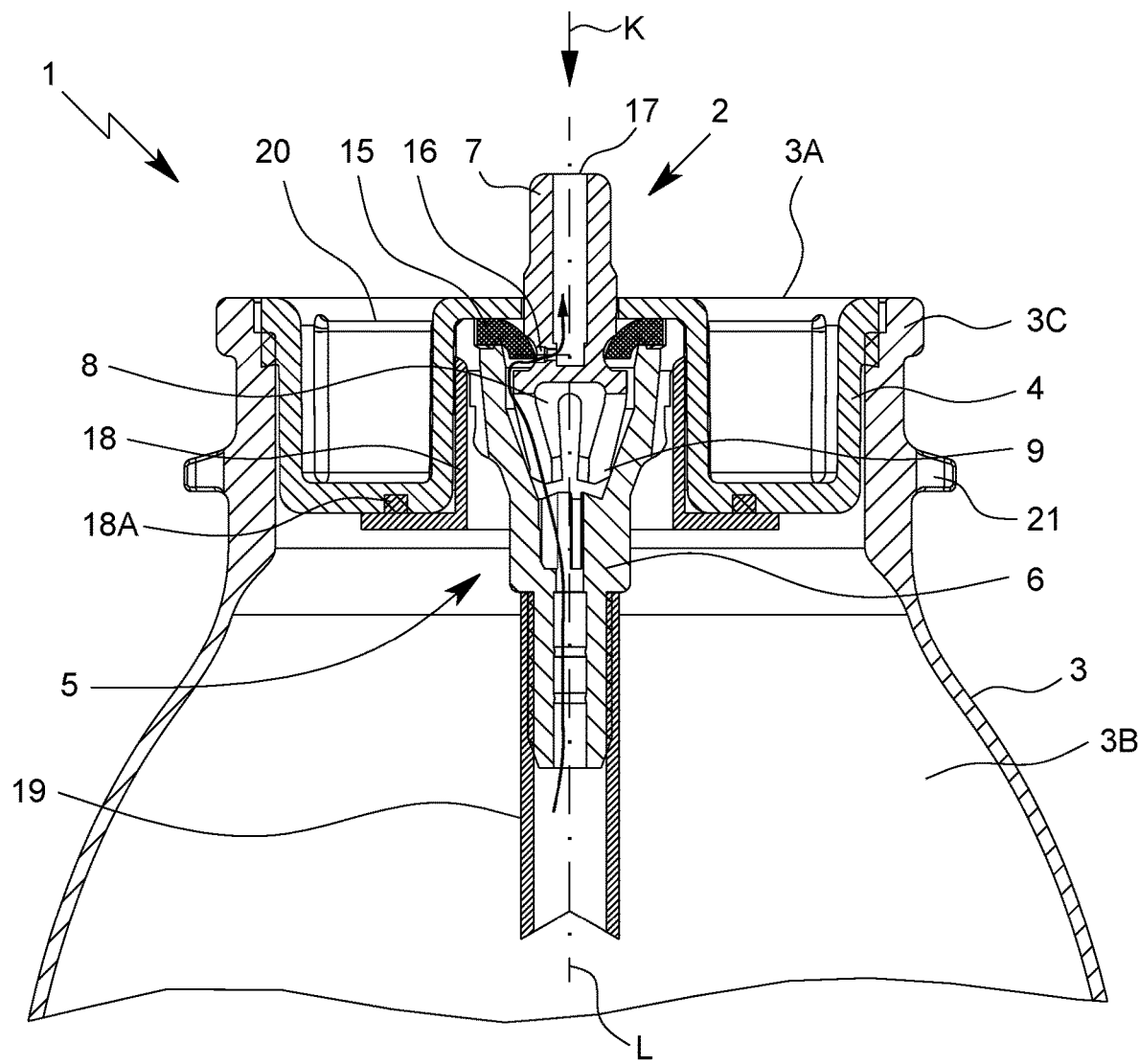
Figure 3:
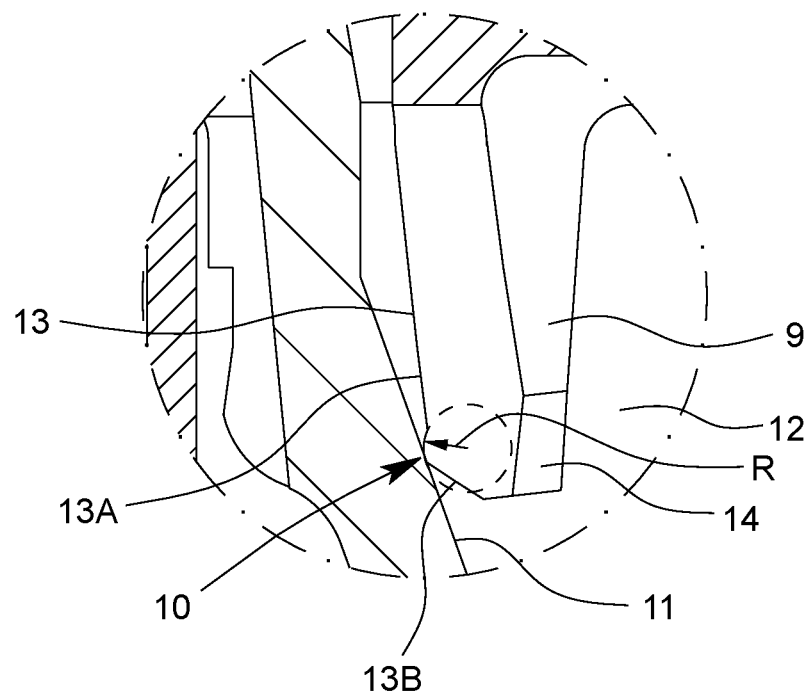
Figure 4:
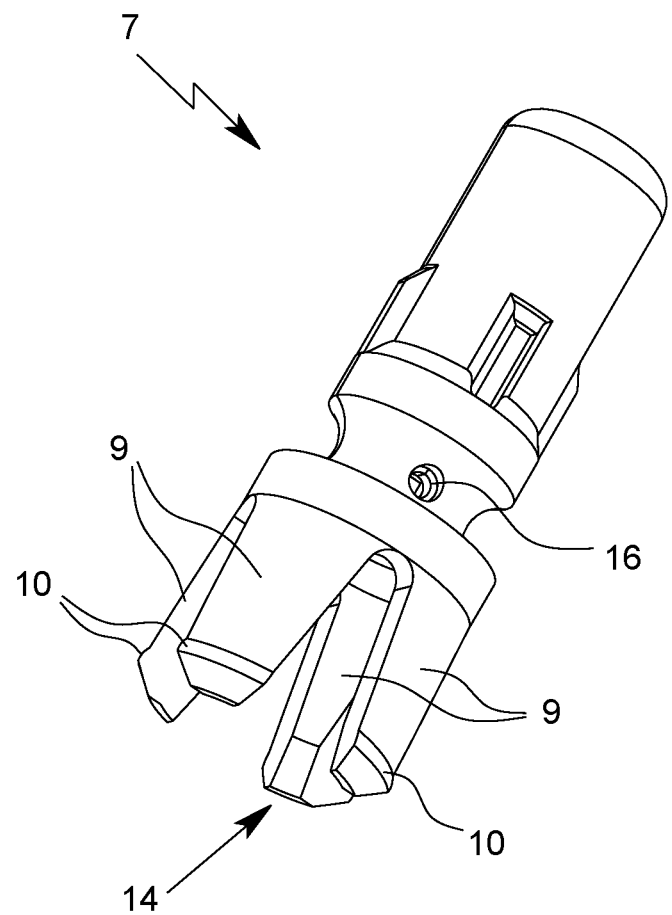

Further aspects, features, advantages and characteristics of the present invention result from the claims and the following description of a preferred embodiment based on the drawing. It shows:

FIG. 1 a section of a proposed dispensing apparatus with a proposed valve in a first, closed position;

FIG. 2 a section of the dispensing apparatus as shown in FIG. 1 with the valve in a second, open position;

FIG. 3 an enlarged section of FIG. 1 showing a contact area of a valve element; and FIG. 4 a perspective view of the valve element.

In the figures, the same reference numbers are used for identical or similar components and devices, wherein the same or corresponding advantages and characteristics may be obtained even if a repeated description is omitted.

FIGS. 1 and 2 each show a section of a proposed dispensing apparatus 1 with a proposed valve 2 and a container 3, wherein in FIG. 1 the valve 2 is shown in a closed position and in FIG. 2 the valve 2 is shown in an open position.

The container 3 is preferably designed as an aerosol container and is accordingly pressure-resistant.

The valve 2 is preferably at least partially arrangeable or arranged in an opening 3A of the container 3, in particular by means of a valve plate 4. In particular, in the (completely assembled) dispensing apparatus 1, the container 3 or its opening 3A is closed or sealed by a valve arrangement 5 which comprises the valve 2 and the valve plate 4.

The valve 2 has a valve housing 6 and a valve element 7 which is movable in the valve housing 6.

The valve element 7 is preferably arranged coaxially to the valve housing 6 and/or inside the valve housing 6. In particular, the valve element 7 is movable axially to the valve housing 6.

The valve 2 has a spring device 8 for moving and/or resetting the valve element 7, in particular to the closed position. Preferably, the spring device 8 is designed in one piece with the valve element 7 and/or moulded onto it. The spring device 8 continues preferably in longitudinal extension or axially from the valve element 7.

Accordingly, the valve element 7 and the spring device 8 are preferably made of the same material, in particular plastic. The valve element 7 with the spring device 8 can be produced by injection moulding, for example.

The valve element 7 is preferably preloaded to the closed position by means of the spring device 8.

Preferably, the container 3 or dispensing apparatus 1 can be filled with a fluid F, in particular after mounting the valve 2. Preferably, the dispensing apparatus 1 or container 3 is filled with a compressed gas or propellant G in addition to the fluid F, so that the fluid F in the container 3 or dispensing apparatus 1 is under pressure.

Preferably, there is an overpressure in the discharge device 1 caused by the propellant G.

Furthermore, dispensing apparatus 1 may have other means for dispensing fluid F not shown in the figures, in particular in the form of a nozzle, spray head or the like. This allows in particular the (controlled) delivery of the fluid F in a desired delivery form, for example as foam or spray or aerosol, and/or the generation of a desired delivery form.

Preferably, to dispense the fluid F, the valve element 7 is pressed or moved into the valve housing 6 against the force of the spring device 8, preferably, for example, by means of a dispensing or spray head not shown, which can be fitted or connected in particular to the free end of the valve element 7 so that valve 2 opens. The pressure of the propellant G then expels the fluid F from the container 3 through the valve 2.

The dispensing apparatus 1 preferably has a feed line or riser 19 arranged and/or connected to the valve 2 and/or valve housing 6, through which the fluid F can initially rise during dispensing, in order to be dispensed via the valve 2 in the usual position of use with the container 3 pointing downwards.

The spring device 8 is preferably arranged coaxially and/or symmetrically to an axis L of the valve 2 and/or valve element 7.

The axis L is preferably an axis of symmetry or longitudinal axis of the dispensing apparatus 1, valve 2, container 3 and/or valve arrangement 5. Statements such as "axial", "coaxial", "radial", etc. preferably refer to the axis L in each case, unless otherwise stated.

The valve element 7 and/or spring device 8 preferably has several spring elements and/or arms 9, in the example shown exactly four arms 9. The arms 9 preferably form the spring device 8. The arms 9 are preferably of the same or identical design.

The arms 9 are laterally preferably bounded by side edges which converge obliquely towards each other in the direction of a free end 14 of the arm 9, so that the arms 9 are preferably at least essentially V-shaped. Accordingly, between the arms 9 preferably triangular and/or essentially V-shaped gaps and/or recesses are built. These recesses allow the arms 9 to be elastically deformed, in particular to be moved radially inwards in the direction of the axis L of the valve 2 without colliding.

In the position of use of the valve 2 attached to container 3, which is shown in FIGS. 1 and 2, the arms 9 protrude from valve element 7, preferably in the direction of an interior space 3B of container 3.

The arms 9 are preferably movable, flexible and/or elastic. In particular, the spring device 8 and/or the arms 9 are designed in such a way that the valve element 7 can be moved and/or is moved and/or returns automatically into the closed position.

When the valve element 7 is moved out of the closed position, the arms 9 are preferably elastically deformed, so that a spring action and/or elastic restoring force is generated, which drives the valve element 7 back into the closed position.

In FIG. 1, the valve 2 or valve element 7 is shown in the first, closed position. FIG. 2 shows the valve 2 or valve element 7 in the second, open position. The first position is also referred to in the following as the rest position.

The first position, or rest position, is the position that the valve 2 and/or valve element 7 occupies when the valve element 7 is not actively moved and/or pressed into valve housing 6, for example, by a user of the dispensing apparatus 1. To move the valve element 7 to the second, open position, it is preferably necessary that a force K is actively applied to valve element 7, which moves the valve element 7 to the open position. The force K is indicated schematically by an arrow in FIG. 2.

When the valve element 7 is moved from the closed position and/or into the open position, preferably the arms 9 are deformed, in particular bent. This is achieved by the arms 9 resting against the valve housing 6 and/or against an inner wall and/or counterface 11 of the valve housing 6 and sliding along it when the valve element 7 moves.

Preferably, the valve element 7 is in direct and/or continuous contact with the valve housing 6, in particular by means of the spring device 8 and/or the arms 9, as shown in FIG. 3 in an enlarged view.

The spring device 8 and/or the arms 9 preferably have a contact area 10. The contact area 10 is preferably designed for contact with a counterface 11 of the valve housing 6.

The counterface 11 is preferably formed by an inner, preferably conical, wall and/or boundary of a receiving space 12 for the valve element 7. The counterface 11 forms with the axis L preferably an angle of more than 10°, in particular more than 15°, and/or less than 30°, preferably less than 25°, in particular about 20°.

When the valve element 7 is moved out of the closed position and/or towards valve housing 6, the arms 9 and/or contact area 10 glide along counterface 11, so arms 9 deform, in particular bend (radially) inward and/or towards the axis L. This generates an elastic restoring force which forces valve element 7 back into the closed position.

The contact area 10 preferably forms an elevation on an outer surface 13 of the valve element 7 or spring device 8. Apart from the contact area 10, the outer surface 13 of the valve element 7 or spring device 8 is preferably flat or even. The terms "flat" or "even" include in particular curved surfaces with no or very little unevenness.

The height of the elevation formed by contact area 10 is preferably about 0.1 mm to 0.2 mm (relative to the outer surface 13).

By means of the contact area 10, the valve element 7 is in contact with the counterface 11 during a movement, preferably in any position of the valve element 7. The contact area formed between the contact area 10 and the counterface 11 is preferably at least substantially punctiform or linear.

In the illustration example, the contact area 10 is shown as an elongated elevation. However, other embodiments are also possible, for example a formation of the contact area as at least essentially point-like and/or dome-like elevation.

The contact area 10 preferably protrudes in radial direction from the spring device 8 and/or outer surface 13.

The contact area 10 is preferably located at a free end 14 or adjacent to a free end 14 of the spring device 8 and/or arm 9.

Preferably, the contact area 10 is located on or adjacent to an outer edge of the spring device 8 and/or arm 9. The outer edge is preferably formed by two sections 13A, 13B of the outer surface 13 which are inclined or angled towards each other.

Preferably, the outer surface 13 and/or the section 13B at the free end 14 forms an angle with the axis L of the valve element 7 which is larger than an angle formed by the counterface 11 with the axis L. In this way, the counterface 11 and the outer surface 13 and/or the section 13B are inclined to each other, so that an acute angle is formed between the section 13B and the counterface 11. This ensures that the arm 9 only has contact with the counterface 11 with the contact area 10, in particular also when the valve element 7 moves from the closed to the open position.

The angle between the section 13B and the axis L is preferably at least 5° or 10° greater than the angle between the counterface 11 and the axis L.

Preferably, the angle between the section 13B and the axis L is more than 40°, preferably more than 45°, and/or less than 60°, preferably less than 55°, in particular about 50°.

The contact area 10 is preferably formed by an elevation in the form of a cylindrical or spherical section. This is illustrated in FIG. 3 by a dotted circle, which indicates a cross-section of the cylinder or sphere.

Preferably, the radius R of the contact area 10 or of the cylindrical or spherical section is more than 0.25 mm, preferably more than 0.35 mm, and/or less than 0.65 mm, preferably less than 0.55 mm, particularly preferably about 0.45 mm.

Preferably, the spring device 8 or the valve element 7 has several contact areas 10, in particular separated and/or unconnected contact areas 10. Preferably, each arm 9 has one or more contact areas 10.

The materials of the spring device 8 and/or the contact area 10 and the counterface 11 are preferably matched to each other in such a way that the contact area 10 slides at least substantially silently on the counterface 11 and/or along the counterface 11 when the valve element 7 moves.

The contact area 10 and/or the counterface 11 preferably consist at least predominantly of plastic, in particular high-performance plastic, in particular preferably polyketone.

High performance plastics are in particular thermoplastics. Preferably, high-performance plastics differ from standard plastics by (improved) temperature resistance, chemical resistance and/or mechanical properties. In particular, high-performance plastics contain aromatic structures.

The plastic may contain or consist of one or more high performance plastics, in particular polyketones.

Particularly preferably, the plastic comprises one or more of the following plastics or consists—at least predominantly—of it: polyether ketone (PEK), polyarylether ketone (PAEK), polyether ether ketone (PEEK), polyether ketone ketone (PEKK), polyether ether ether ketone (PEEEK), polyether ether ketone ketone (PEEKK) and/or polyether ketone ether ketone ketone (PEKEKK).

However, it is also possible that the counterface 11 and the contact area 10 are made of different materials. Alternatively or additionally, the contact area 10 and/or the counterface 11 has a coating. In particular, such a coating can reduce or minimize friction between the counterface 11 and the contact area 10. Alternatively or additionally, the coating prevents squeaking.

The spring device 8 and/or the arms 9 preferably have a Young's modulus higher than 2000 MPa, preferably higher than 2500 MPa, and/or lower than 4000 MPa, preferably lower than 500 MPa. This allows a sufficiently large restoring force to be achieved and/or a reliable return of valve element 7 to the closed position.

The Young's modulus is preferably determined according to DIN EN ISO 527-1:2012-06, DIN EN ISO 527-2:2012-06 and/or DIN EN ISO 527-3:2003-07.

The Young's modulus defined in Chapter 3 of DIN EN ISO 527-1:2012-06 is the slope of the stress-strain curve of a material at a defined strain interval and is preferably expressed in megapascals (MPa). The Young's modulus can be calculated as the chord modulus or as the slope of a linear least-squares fit in the defined stress interval, as described in more detail in Chapter 10.3 of DIN EN ISO 527-1:2012-06.

Alternatively or additionally, the Young's modulus may be measured or determined as described in DIN EN ISO 527-3:2003-7, in particular if the arms 9 have a thickness of 1 mm or less.

The measuring methods, devices and test specimens used for measuring or determining the Young's modulus are described in Chapters 4 to 9 and Annex C of DIN EN ISO 527-1:2012-06 and are explained in more detail in DIN EN ISO 527-2:2012-06, in particular in Chapter 6.

The arms 9 preferably have a length in the axial direction of more than 2 mm, preferably more than 3 mm, and/or less than 6 mm, preferably less than 5 mm, in particular about 4 mm.

The extension of arms 9 in the radial direction is preferably more than 0.4 mm, preferably more than 0.6 mm, and/or less than 1.2 mm, preferably less than 1 mm, in particular about 0.8 mm.

The lateral edges of arms 9 preferably include an angle of more than 10°, preferably more than 15°, and/or less than 30°, preferably less than 25°, in particular about 20°.

At the free ends 14, two adjacent arms 9 preferably have a distance of more than 1.5 mm and/or less than 3 mm, in particular about 2 mm to 2.5 mm.

The specified dimensions of the arms 9 in combination with the specified Young's modulus make it possible to achieve an optimum spring action and/or spring constant for the function of valve 2, which on the one hand allows comfortable operation, in particular because the spring action does not create too much resistance when moving valve element 7 into the closed position, and on the other hand ensures reliable return of valve element 7 into the closed position.

The valve 2 preferably has a seal 15. The seal 15 is preferably formed by a sealing ring.

The seal 15 of valve 2 is preferably at least predominantly made of polyethylene or a thermoplastic elastomer, in particular a urethane-based thermoplastic elastomer (TPU).

The seal 15 is preferably deformable and/or preferably consists of a flexible and/or elastically deformable material.

The seal 15 is located between the valve housing 6 and the valve plate 4, so that the valve 2 is sealed against the environment and in particular no fluid F can pass between the valve plate 4 and the valve 2, in particular the valve housing 6 and/or the valve element 7.

Preferably, the seal 15 radially surrounds the valve element 7. The valve element 7 preferably has a particularly ring-like recess and/or recess in which the seal 15 engages and/or against which the seal 15 rests.

The valve element 7 preferably has a breakthrough 16, which is in particular designed as a radial bore and which opens into an outlet 17 of the valve 2 or valve element 7. The breakthrough 16 is preferably located in the area of the recess in which the seal 15 engages. Preferably, the seal 15 in the closed position seals the breakthrough 16.

When the valve element 7 is moved from the closed position in the direction of the valve housing 6, preferably the seal 15 is deformed, as shown in FIG. 2. The deformation of the seal 15 at least partially uncovers the breakthrough 16. This allows a pressurized fluid F to pass from the inside of the container 3 through the receiving space 12 of the valve housing 6 between the arms 9 to the breakthrough 16 and finally leave the valve 2 or valve element 7 via the outlet 17. The path taken by the fluid F is indicated by an arrow in FIG. 2 as an example.

It is preferred that the valve element 7, the valve housing 6 and/or the seal 15 are made of the same material.

Preferably, the valve housing 6, the valve element 7 and the seal 15 can be connected or joined together so that valve 2 can be pre-assembled. In particular, the valve 2 pre-assembled in this way forms a coherent or connected assembly which can be inserted as a whole into the valve plate 4. In other words, the valve housing 6, the valve element 7 and the seal 15 can preferably be assembled or pre-assembled in such a way that valve 2 can be handled as a coherent or connected valve 2 when assembling the valve arrangement 5 or dispensing apparatus 1, in particular without the parts separating during assembly. This is conducive to easy handling, as the number of individual components to be handled during assembly is reduced.

Preferably, the valve arrangement 5 has a (separately manufactured) fastening part 18 for fastening the valve 2 and/or valve housing 6 to the valve plate 4. The fastening part 18 can preferably be connected or connected to the valve plate 4 by means of a material bond. The valve 2, in particular the valve housing 6, is preferably held at and/or fastened to the valve plate 4 by means of the fastening part 18.

The valve housing 6, the valve element 7, the valve plate 4, the seal 15 and the fastening part 18 preferably form constructionally separate or separately manufactured components.

Preferably, the valve plate 4, the fastening part 18, the valve arrangement 5, the valve 2, the valve housing 6, the valve element 7 and/or the container 3 are made of plastic, in particular the same plastic.

The fastening part 18 is preferably ring-shaped and/or at least essentially cylindrical and/or hollow cylindrical or sleeve-shaped. In the illustration example, in addition to a cylindrical and/or hollow cylindrical section, the fastening part 18 has a second section projecting radially from this section. The second section is preferably arranged at right angles to the first cylindrical section, in particular at one axial end of the fastening part 18.

The fastening part 18 is preferably fixed or fastened to the valve plate 4 by a welding process, in particular ultrasonic welding, laser welding or laser transmission welding and/or friction welding, or is connected (materially bonded) to the valve plate 4.

In the illustration example, the fastening part 18 is axially welded to the valve plate 4 via a weld seam 18A. However, the fastening part 18 can also be radially welded to the valve plate 4.

On the (completely assembled) dispensing apparatus 1, the valve plate 4 is preferably friction-welded to the container 3.

For this purpose, the valve plate 4 can have a collar on an outer edge, which forms an annular groove open downwards and/or in the direction of the container 3 to accommodate an edge 3C of the container 3.

However, FIG. 1 shows an embodiment without collar. In this embodiment, the valve plate 4 preferably closes axially flush with the container 3 or its edge 3C.

A flush closure makes it possible to easily and reliably check the connection between the container 3 and the valve plate 4 and/or the valve arrangement 5, which is preferably made by friction welding, since the flush closure and/or defined seat of the valve plate 4 is an indication of the correct or flawless connection. In particular, it is an indication of a faulty connection or welded joint if, after the connection has been made, the (collarless) valve plate 4 is not axially flush with the edge 3C of container 3.

The valve plate 4 preferably has a coupling device 20, which is designed for non-rotational coupling of the valve plate 4 with a tool and/or holder for friction welding of the valve plate 4 to the container 3. The coupling device 20 is preferably formed by or has coupling elements preferably extending radially, the coupling elements being arranged in particular on the upper side of the valve plate 4.

The container 3 preferably has a coupling section 21, which is designed for rotationally fixed coupling with a tool and/or holder for and/or during friction welding of the valve plate 4 to the container 3. The coupling section 21 is particularly located in or on a neck area of container 3.

According to a preferred embodiment, the coupling section 21 has or is formed by one or more coupling elements projecting radially from the container.

Preferably, the coupling section 21 is designed as a collar and/or radially projecting element surrounding the container 3 and/or opening 3A. Preferably, the coupling section 21 has one or more engagement elements, in particular mutually opposite engagement elements, which are designed for engagement with a holder. The engagement elements can be formed in particular by recesses.

Individual aspects and features of the various embodiments can be realized and advantageously individually and in any combination.

LIST OF REFERENCE NUMBERS

1 Dispensing apparatus
2 Valve
3 Container
3A Opening
3B Interior space
3C Edge
4 Valve plate
5 Valve arrangement
6 Valve housing
7 Valve element
8 Spring device
9 Arm
10 Contact area
11 Counterface
12 Receiving space
13 Outer surface
13A Section (outer surface)
14 Free end
15 Seal
16 Breakthrough
17 Outlet
18 Fastening part
18A Weld seam
19 Riser
20 Coupling device
21 Coupling section
F Fluid
G Propellant
K Force
L Axis
R Radius

The invention claimed is:

1. A dispensing apparatus configured for dispensing a fluid comprising:
    a container and a valve, the valve comprising a valve housing,
    a valve element movably arranged in the valve housing, and
    a spring device configured to return the valve element to a closed position, the spring device being formed integrally with the valve element,
    wherein the spring device is formed by a plurality of arms extending in a longitudinal extension of the valve element from the valve element,
    wherein each of said arms has a contact region for bearing against a counterface of the valve housing, the contact region forming an elevation of an outer surface of the arms.

2. The dispensing apparatus according to claim 1, wherein the arms are at least substantially V-shaped.

3. The dispensing apparatus according to claim 1, wherein at least substantially V-shaped recesses are formed between the arms.

4. The dispensing apparatus according to claim 1, wherein the contact region is located at or adjacent a free end of the spring device.

5. The dispensing apparatus according to claim 1, wherein the contact region is located at or adjacent an outer edge of the spring device.

6. The dispensing apparatus according to claim 1, wherein an angle formed by an outer surface of an end portion of the spring device with a longitudinal axis of the valve element is greater than an angle formed by the counterface with the longitudinal axis by at least 5°.

7. The dispensing apparatus according to claim 1, wherein a radius of the contact region is more than 0.25 mm, and/or less than 0.65 mm.

8. The dispensing apparatus according to claim 1, wherein the spring device comprises a plurality of contact regions separated from one another.

9. The dispensing apparatus according to claim 8, wherein each arm of the spring device has a contact area.

10. The dispensing apparatus according to claim 1, wherein the contact region and/or the counterface is or are made of polyketone(s).

11. The dispensing apparatus according to claim 1, wherein the spring device or its arms has/have a Young's modulus of more than 2000 MPa, and/or less than 4000 MPa.

12. The dispensing apparatus according to claim 1, wherein the counterface is conical.

13. The dispensing apparatus according to claim 1, further comprising a seal, wherein the seal is made of a urethane-based thermo-plastic elastomer.

14. The valve according to claim 13, wherein the seal is arranged at an end of the valve housing and seals a radial bore of the valve element.

15. A dispensing apparatus configured for dispensing a fluid comprising:
    a container and a valve, the valve comprising a valve housing,
    a valve element movably arranged in the valve housing and a spring device configured to return the valve element to a closed position, the spring device comprising a contact region sliding on a counterface of the valve housing when moving the valve element from a closed to an open position and vice versa,
    wherein materials of the spring device or contact region and of the counterface are matched to one another in such a way that the contact region slides at least substantially silently on the counterface during a movement of the valve element; and wherein the contact area and/or the counterface consist at least predominantly of polyketone.

16. The valve according to claim 1, wherein:
one or more of:
during a movement of the valve element, the contact region of the spring device and the counterface are in contact with one another in any position of the valve element via an at least substantially punctiform contact surface, and/or the materials of the spring device or of a contact region of the spring device and of a counterface are matched to one another such that the contact region slides at least substantially silently on the counterface during a movement of the valve element.

\* \* \* \* \*